INVENTOR.
ALLAN D. YABLIN
ATTORNEY

Aug. 17, 1943.  A. D. YABLIN  2,327,299
METHOD OF MAKING FLOAT BALLS
Filed Dec. 27, 1941   2 Sheets-Sheet 2
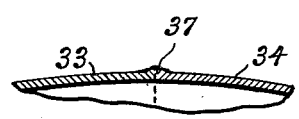
Fig. 9.
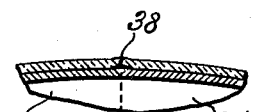
Fig. 10.
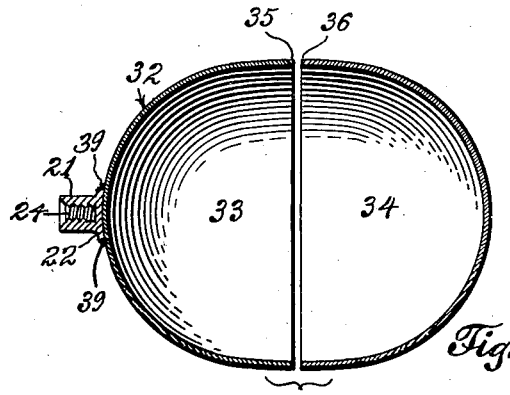
Fig. 8.
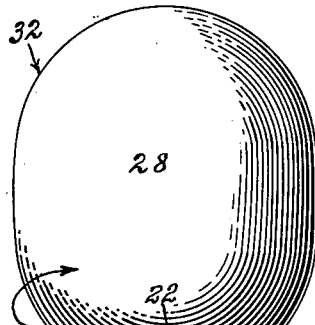
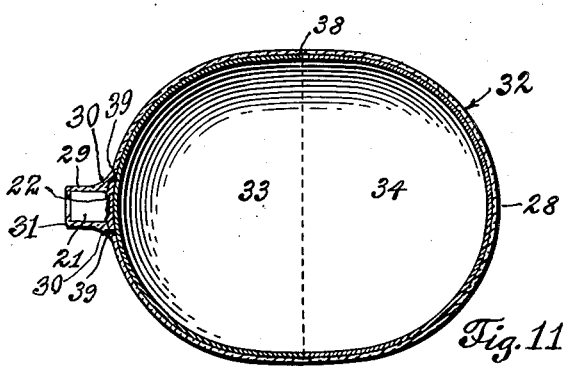
Fig. 11.
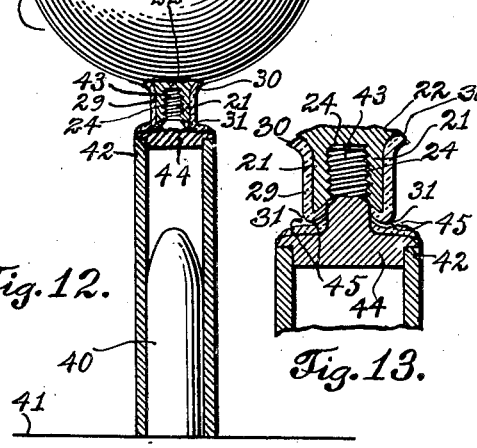
Fig. 12.
Fig. 13.
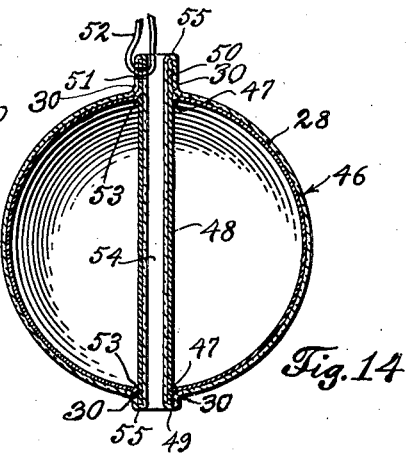
Fig. 14.
INVENTOR.
ALLAN D. YABLIN
BY Joshua R. H. Potts
ATTORNEY Patented Aug. 17, 1943

2,327,299

UNITED STATES PATENT OFFICE 2,327,299

METHOD OF MAKING FLOAT BALLS

Allan D. Yablin, Chicago, Ill.

Application December 27, 1941, Serial No. 424,628

6 Claims. (Cl. 117—66)

This invention relates to a method of making float balls for flush tanks, steam traps or feed water heaters on steam boilers or the like, or for other uses and more particularly to a method of making new article of manufacture consisting of a porcelain coated or vitreous enameled metal float ball.

Heretofore in the manufacture of floats or float balls for flush tanks and steam traps and the like it has been customary to take two substantially semispherical sections of sheet metal such as light sheet copper of thin gauge which may be corrugated for stiffening purposes and forming an outwardly and laterally directed flange on one section which is turned over and crimped tightly against an outwardly extending flange of the other section to form a liquid tight joint in which a packing is sometimes inserted or interposed. One of the sections has an opening in which a plug or nipple having a threaded socket to take the arm of the float valve is inserted and joined to the shell of the float or the base flange of the nipple may be welded directly to the crown or outer surface of the float or a section thereof. However, due to the restrictions on certain metals such as copper I have devised a float which may be oval, spherical or of other shape and made of ordinary cold rolled steel or stainless steel, but preferably the former, and coated with porcelain enamel compound or ingredients so as to entirely cover the metal surface of the ball and nipple including the free end of the latter and subsequently gas fired, heat treated or baked to vitrefy or fuse the coating and prevent corrosion or rusting which was one of the objections to floats as heretofore made. This also takes care of the restrictions on said metals and serves to replace copper and other float balls, the materials of which cannot be obtained and the invention not only relates to a new article of manufacture consisting of a porcelain enameled metal ball but also to the method and means of making the same.

The present invention therefore provides a metal, preferably of cold rolled steel or other suitable sheet steel or metal which is coated with a heat treated porcelain enameled covering so produced as to eliminate all possible exposure of the metal around the ball area or where connection is made to the flush or supply valve arm which controls the operation of the valve to supply water, steam, or other liquids or fluids, thereby preventing corrosion or rusting of the metal of the float or subsequent chipping or cracking of the enamel to expose the metal which would permit such corrosion or rusting of exposed metal parts and render the float ineffective for service.

The invention also provides a float ball which will withstand high pressure and temperature such as of steam and resist corrosion or rusting by being coated with porcelain enamel or double coated, to more effectively resist the effects of acids and to a novel method and means of making or producing the same whereby a metal ball is provided for subsequent coating which will be smooth and avoid rough surfaces or sharp projections or points which would otherwise render the coating defective or permit cracking and subsequent ineffectiveness of the float ball for service.

Further objects and advantages will appear and be brought out more fully in the following specification, reference being had to the accompanying drawings, in which:

Fig. 8 is a sectional view showing a modified form of float ball with the parts or sections thereof separated and ready to be abutted and welded together;

Fig. 9 is a fragmentary section showing the parts of the float ball joined by welding;

Fig. 10 is a view similar to Fig. 9 with an enameled coating applied;

Fig. 11 is a sectional elevation of the complete float ball;

Fig. 12 is a sectional elevation showing the method of supporting the float balls for enameling and heat treating the same;

Fig. 13 is an enlarged fragmentary section showing the manner of separating the porcelain enamel at the plug connection, and Fig. 14 is a sectional elevation showing another form of float ball.

Figure 1:
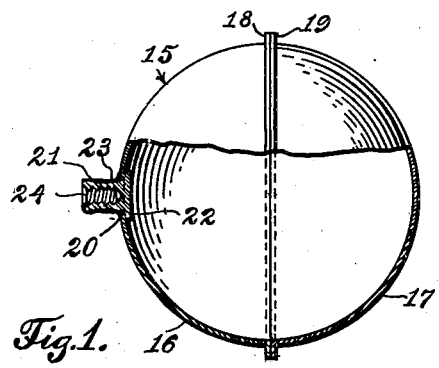
Fig. 1 is an elevation partly broken away and in section of a float ball showing the manner of assembling the metallic parts thereof.

Referring more particularly to Figs. 1 to 7 inclusive of the drawings, there is shown a spherical or round float ball 15 although the same may be oval or other shape. This ball comprises two similar semispherical sections 16 and 17 produced from metal and spun or pressed into shape, preferably of cold rolled steel although it may be of stainless steel or other suitable metal. Each of these sections is provided at its meeting edge with a circumferential flange extending outwardly as indicated at 18 and 19. One section at the crown thereof or at the joint if desired is provided with a circular opening or hole 20 designed to take a flanged plug or nipple 21 having a base flange or head 22 which abuts the inner face of the section around the hole and is welded thereto as indicated at 23 before the ball sections are assembled. The plug is provided with a threaded socket 24 the inner wall of which is imperforate at the base or flange and is adapted to receive the threaded end of an arm or rod 25 of a float valve (not shown) as used in flush tanks, steam traps or the like and controlling the operation of the valve.

Figure 2:
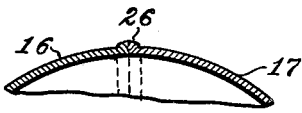
Fig. 2 is a fragmentary section showing the initial welding step.
Figure 3:
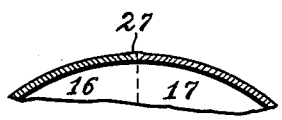
Fig. 3 is a fragmentary section showing the welded joint ground smooth to take a porcelain enameled coat.
Figure 4:
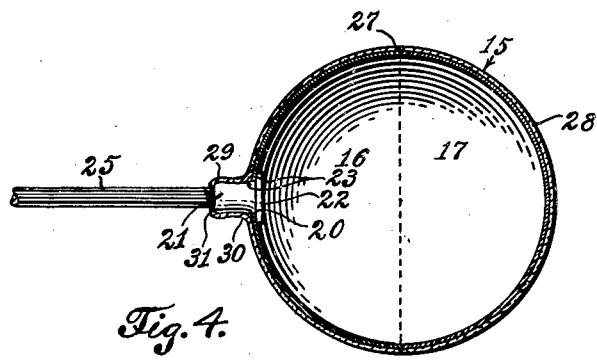
Fig. 4 is a sectional elevation showing the complete float ball with a porcelain enamel coating.
Figure 5:
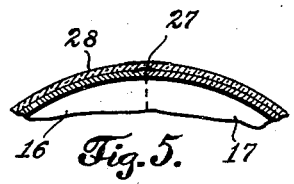
Fig. 5 is an enlarged fragmentary section showing the ball of Fig. 3 coated at the joint.
Figures 6, 7:
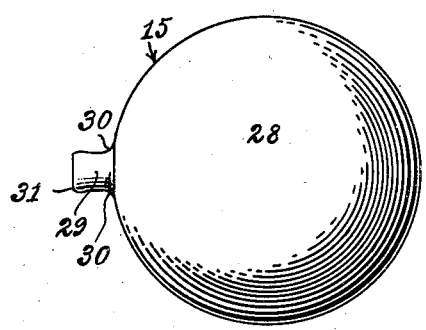
Fig. 6 is an elevation showing a complete float ball with a porcelain enamel coating.
Fig. 7 is an enlarged axial section at the plug designed for connection with a float valve arm.

After the plug is secured in position, the flanges 18 and 19 are placed in abutting relation and welded together around the circumference of the ball as indicated at 26 in Fig. 2. In ordinary cold rolled steel this produces a seam which has a projecting bead or rib with an uneven surface which is rough and has some sharp points and therefore it is necessary to grind down this seam to produce a perfectly smooth surface as indicated at 27 in order to take a coating of porcelain enamel and prevent exposure of the sharp or projecting portions of the welded seam which might be exposed through the enamel and therefore result in rust or corrosion of the metal and cause the enamel to chip. To avoid this the metal of the flanges which has been burned or oxidized in the welding process to produce the seam 26 must be ground down and made smooth, thus preventing exposure of the metal to rust or corrosion and also preventing chipping of the porcelain enamel coating subsequently applied thereto as will be described. The porcelain enamel coating which may be white or any color desired is indicated at 28 and extends throughout the peripheral or exterior surface of the ball and over the plug 21 as indicated at 29 in a symmetrical curved formation at the junction of the two, preferably slightly or gradually thickened in curved uniform contour at said juncture and tapering therefrom or thinner in opposite directions as indicated at 30 to avoid sharp corners and also over the edge of the plug 21 around the threaded socket 24 as indicated at 31 in Figs. 4 and 7 of the drawings so as to prevent exposure of the end of the plug which is also of steel or other suitable metal and thus prevent rusting thereof when the rod 25 is in position.

Referring to the form of the invention shown in Figs. 8 to 13 inclusive, there is illustrated an oval or spheroidal float ball 32 comprising similar sections 33 and 34 of metal as above described in connection with sections 16 and 17. In the event that these sections are made of stainless steel the edges 35 and 36 thereof are brought together in abutting relation after the plug is secured in position as previously described and then welded around the circumference as indicated at 37. This welding may be done by what is known as the atomic hydrogen method in which the hydrogen seals the flame and prevents burning and oxidation of the metal at the joint so as to leave a relatively smooth seam as indicated at 38. In the event that cold rolled steel is used or other suitable metal, or where the welded joint has a rough annular projection or bead, the same is ground smooth. In lieu of disposing the plug 21 through the aperture in one of the sections or the abutting edges of the sections, the base flange 22 thereof may be welded directly to the crown of one of the sections such as the outer surface of section 33 as indicated at 39. In this form the porcelain enamel coating is also indicated at 28 and the parts of the plug designated by the same numbers as used in connection with Figs. 1 to 7 inclusive.

The method and means of coating the metallic float ball with a porcelain enamel and supporting the same during the heat treating or baking thereof is shown in connection with Figs. 12 and 13 and this is used with both forms irrespective of the shape of the ball. As illustrated, upstanding pins 40 are provided on a suitable rack 41, these upright pins being designed to take an adaptor including a tubular metallic part 42 one of which is placed over each pin. One end is provided with a threaded stud 43 having a base flange 44 welded or otherwise secured over one end of the tube. This threaded stud is designed to engage the threaded socket 24 in the same manner as the arm or rod 25 and supports the ball in the manner shown in Fig. 12 of the drawings so that the same may be sprayed with the cold liquid porcelain enameling compound or ingredients. Spraying is used because dipping would form a projecting tip or sharp point at the bottom and by spraying the same the coating drains smoothly over the entire area of the ball and down around the plug or nipple 21 and the end or edge 31 at the open end of the socket so as to cover the latter and prevent exposure of the metal to rusting or corrosion. This is possible because the shank or stud 43 is smaller than the plug 21 and the material of the porcelain enamel flows into this reduced diameter around the stud 43 and over the top of the base flange 44. This material is allowed to set in order to dehydrate the same, and by turning either the ball or the adaptor to partly unscrew the same at the threaded connection with the other held stationary or both turned in opposite directions, a physical separation, parting or breaking of the enamel is caused to take place by the longitudinal or axial movement of one relative to the other at the threads as indicated at 45 so that the coating is allowed to extend over the exposed open end of the plug around the socket 24. The dehydration or setting of the porcelain enamel coating requires half an hour or more. The balls so sprayed with the coating are placed in an oven which is preferably gas fired at a temperature preferably between 1300 degrees and 1500 degrees Fahrenheit. In practice a temperature of 1350 degrees has been used and this melts the porcelain enameling compound or ingredients or silicates, glass and oxides forming the same so that the glass or earthen ware composition of the porcelain enamel melts or fuses and flows over the ball in one piece and possibly forms a bond or vehicle causing a fusion or molecular union with the metal. Of course it is preferable to use some metal having a high tensile strength so that the same may be used in connection with steam traps in which the enamel will withstand high pressures and temperatures such as, by way of example, a temperature of 212 degrees Fahrenheit or more and a pressure of 150 pounds or more per square inch. Also, the porcelain enamel coating will render the ball absolutely liquid tight and resist acid corrosion but a second coating which may be of transparent enamel may be used as an acid resistant if desired. An important feature of the invention in the method and means of producing the enamel coating using a porcelain composition is the manner of supporting the ball during the spraying and heat firing or baking thereof in a gas fired or other suitable oven and the turning of the ball or adaptor before or after heat treating to cause the longitudinal separation or parting of the porcelain enamel at the stud or shank 43 around the plug and particularly over the exposed edge thereof around the socket 24 and slightly beveled inwardly in the form in which it takes by reason of such method. This also prevents breaking off of the porcelain enamel at any other point around the plug which might result in exposing the metal for rust or corrosion.

In the form of the invention shown in Fig. 14 of the drawings a ball 46 is shown made of one or two sections having openings 47 at diametrically opposite points to take a tube 48 having projecting ends 49 and 50. An opening or hole 51 may be provided in one of the projecting ends such as the end 50 to receive a supporting wire 52 for suspending the same from a suitable rack within the oven. The projecting ends 49 and 50 may be welded to the ball 46 around the openings 47 as indicated at 53 and the tube 48 is porcelain enameled inside as indicated at 54 while the exterior is coated as at 28 as previously described. This may also be done by dipping or spraying, preferably the latter so that the inner and outer coatings will cover the ends of the tube as indicated at 55 to form a continuous unbroken coating throughout the area of the ball and over the plug or tube in each instance whereby all possibility of the exposure of the metal to rust or corrosion is prevented. The tube is designed to take the rod or stem of a float valve which is usually clamped against the ends of the tube by nuts as is common in the art.

Also, it is to be understood that the float ball may be of any shape but that in each instance all rough spots or points of metal are removed so that exposure of the metal or chipping of the porcelain enamel will be prevented. In either form, the float ball will stand up under high pressures and temperatures but the pressure it will withstand may be determined by the thickness or gauge and tensile strength of the metal wall of the ball and possibly the thickness of the coating. Also, in the form of the invention shown in Fig. 14, the end of the tube provided with the hole 51 which is drilled through the same to take the supporting wire 52 in order to suspend the ball in an oven, will generally be above the water level and therefore not particularly subject to rust or corrosion but this hole 51 may be protected by enamel or enameled over in addition to keeping the wall thereof out of contact with the water to prevent rust or corrosion at that point. As an alternative method, the hole 51 may be closed with some water-proof cement or asphaltum after the float has been porcelain enameled. It may also be mentioned that before coating the ball with porcelain enamel, the metal thereof is first put through a series of pickling operations using for example acetic or muriatic acid and then sprayed or dipped with the porcelain enamel compound while cold and allowed to set or dry in a smooth hardened or semi-hardened condition or until dehydrated. It is then put in the oven with the rack for firing or heat treating in the manner described.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having thus described my invention, what I claim as new and desire to secure by Letters Patent is:

1. The method of producing a porcelain enameled float ball having a projecting nipple, consisting in coating a metallic ball and nipple exteriorly with enameling compound while supported at a point out of contact with the surface to be enameled and spaced therefrom and separating the enamel between the end of the nipple and the point of support whereby the enamel will extend over said end and surplus enamel will be removed.

2. The method of producing a porcelain enameled float ball consisting in coating a metallic ball exteriorly with liquid enameling compound while supported at a single point out of contact with the surface to be enameled, mechanically separating the enamel in spaced relation to the metallic surface of the ball and the point of support of the ball and then heat treating the same at a comparatively high temperature.

3. The method of producing a porcelain enameled float ball consisting in coating a previously pickled metallic ball exteriorly with liquid enameling compound while supported at a point thereon out of contact with the surface to be enameled, allowing said coating to dehydrate, moving the ball and support apart relatively to part the compound in spaced relation to the ball surface being coated and the support at said point and then subjecting the same to a temperature in an oven of between 1300 and 1500 degrees Fahrenheit.

4. A method of forming enameled float balls having a threaded plug projecting therefrom, consisting in supporting the ball at the plug, spraying the ball with porcelain enameling ingredients and then causing longitudinal separation of the plug relative to its support to cause parting of the coating over the edge of the plug.

5. A method of making float balls consisting of spraying a metallic ball having a projecting nipple with a threaded socket, with enamel compound while supported at the socket in spaced relation to the periphery of the nipple, subjecting the same to the action to heat to cause the compound to fuse and flow over the ball and nipple and between the nipple and the support for vitrification and separating the enamel between the end of the nipple and the support to leave the coating over the end of the nipple.

6. A method of forming enameled float balls having an interiorly threaded plug projecting therefrom, consisting in threadedly and rotatably supporting the ball vertically and interiorly at the interior threads of the plug with the plug at the bottom of the ball, and the support enlarged therebeneath relative to the plug and spaced from the end thereof, spraying the ball with a coating of porcelain enameling compound, subjecting the same to a heat treatment for causing the compound to fuse and flow evenly over the exterior surface of the ball and plug and between the same and the support, allowing the coating to set, and relatively rotating and separating the ball and support to part the enamel in spaced relation to the end of the plug and support in conformity with and covering said end of the plug.

ALLAN D. YABLIN.